(12) United States Patent
Tuhkunen (10) Patent No.: US 11,319,106 B2
(45) Date of Patent: May 3, 2022

(54) LEAKPROOF AND LIQUID-TIGHT PACKAGING BOX OF CORRUGATED BOARD AND METHOD FOR FABRICATING IT

(71) Applicant: STORA ENSO OYJ, Helsinki (FI)

(72) Inventor: Mika Tuhkunen, Lahti (FI)

(73) Assignee: STORA ENSO OYJ, Helsinki (FI)

( * ) Notice: Subject to any disclaimer, the term of this patent is extended or adjusted under 35 U.S.C. 154(b) by 0 days.

(21) Appl. No.: 16/640,457

(22) PCT Filed: Jul. 13, 2018

(86) PCT No.: PCT/FI2018/050546
§ 371 (c)(1),
(2) Date: Feb. 20, 2020

(87) PCT Pub. No.: WO2019/038471
PCT Pub. Date: Feb. 28, 2019

(65) Prior Publication Data
US 2020/0207507 A1    Jul. 2, 2020

(30) Foreign Application Priority Data

Aug. 24, 2017    (FI) .................................. 20175758

(51) Int. Cl.
*B65D 5/22*        (2006.01)
*B65D 5/468*       (2006.01)
(Continued)

(52) U.S. Cl.
CPC ............. *B65D 5/22* (2013.01); *B65D 5/4608* (2013.01); *B31B 2100/00* (2017.08);
(Continued)

(58) Field of Classification Search
CPC ........ B65D 5/22; B65D 5/4608; B65D 5/001; B65D 5/003; B65D 5/0015; B65D 5/0035;
(Continued)

(56) References Cited

U.S. PATENT DOCUMENTS 3,102,674 A * 9/1963 Hamilton ........... B65D 5/48048
229/117.21
3,137,434 A * 6/1964 Berg .................... B65D 5/3664
229/175
(Continued)

FOREIGN PATENT DOCUMENTS

AU        2010100834      9/2010
AU        2011201525      10/2011
(Continued)

OTHER PUBLICATIONS

Granting Decision in corresponding RU App No. 2020110410/11(017517) dated Oct. 19, 2020 (w/translation), 20 pages.
(Continued)

*Primary Examiner* — Christopher R Demeree
(74) *Attorney, Agent, or Firm* — Nixon & Vanderhye PC (57) ABSTRACT

A leakproof and liquid-tight packaging box of corrugated board, which box is erected mechanically using glueing as an aid. What is essential in the invention is that the corner surfaces of the structurally strong, torsionally rigid, leakproof and liquid-tight packaging box stackable one on top of another are folded and glued to the outer surface of the vertical surface of the short side. In addition, it comprises an inward-formed cone structure of the vertical surface of the long side of the box, and a rigid and load-resistant beam structure is formed on all sides of the packaging box.

10 Claims, 5 Drawing Sheets

(51) Int. Cl.
   *B65D 5/00* (2006.01)
   *B65D 5/24* (2006.01)
   *B65D 5/42* (2006.01)
   *B31B 100/00* (2017.01)

(52) U.S. Cl.
   CPC .............. *B65D 5/001* (2013.01); *B65D 5/248* (2013.01); *B65D 5/4266* (2013.01)

(58) Field of Classification Search
   CPC . B65D 5/248; B65D 1/34; B65D 5/20; B65D 5/244; B65D 5/247; B65D 5/3664
   USPC ....... 229/177, 178, 915, 176, 916, 919, 171, 229/122.32, 172, 187, 174; 206/509, 821
   See application file for complete search history.

(56) References Cited

U.S. PATENT DOCUMENTS

| | | | | |
|---|---|---|---|---|
| 3,810,574 | A | * | 5/1974 | Gardner ................. B65D 5/247 229/170 |
| 3,871,570 | A | * | 3/1975 | Garmon ................. B65D 5/003 206/509 |
| 3,940,053 | A | * | 2/1976 | Putman ................. B65D 5/003 206/509 |
| 3,973,723 | A | * | 8/1976 | Owens .................. B65D 5/003 229/143 |
| 4,175,691 | A | | 11/1979 | Cornell et al. |
| 4,253,602 | A | | 3/1981 | Kulig |
| 4,537,344 | A | * | 8/1985 | Thomas ................. B65D 5/003 206/509 |
| 5,860,590 | A | | 1/1999 | Blomfield et al. |
| 2005/0006277 | A1 | | 1/2005 | Moss et al. |
| 2013/0056528 | A1 | | 3/2013 | Sullivan et al. |
| 2013/0270333 | A1 | | 10/2013 | Scott |
| 2016/0001917 | A1 | | 1/2016 | Gould et al. |
| 2016/0318650 | A1 | | 11/2016 | Epstein et al. |
| 2017/0107009 | A1 | | 4/2017 | Baryshyan |

FOREIGN PATENT DOCUMENTS

| | | |
|---|---|---|
| CL | 198200120 | 6/1982 |
| CL | 200100071 | 10/2001 |
| CL | 200100073 | 11/2001 |
| CL | 200403348 | 3/2006 |
| CL | 201402785 | 1/2015 |
| CO | 03087152 | 10/2003 |
| CO | 04022228 | 3/2004 |
| EP | 1 122 177 | 8/2001 |
| FI | 10658 | 10/2014 |
| FR | 2 564 427 | 11/1985 |
| FR | 2 622 536 | 5/1989 |
| GB | 821245 | 10/1959 |
| JP | 55-74624 | 5/1980 |
| JP | 3007625 | 2/1995 |
| JP | 10-218185 | 8/1998 |
| JP | 2004-175433 | 6/2004 |
| JP | 2010-111421 | 5/2010 |
| KR | 10-2010-0057386 | 5/2010 |
| KR | 10-2013-0100644 | 9/2013 |
| RU | 2264956 | 11/2005 |
| WO | 2006/075935 | 7/2006 |

OTHER PUBLICATIONS

Search Report in corresponding CO App No. NC2020/0003153 dated Sep. 16, 2020, 2 pages.
International Search Report for PCT/FI2018/050546 dated Oct. 16, 2018, 4 pages.
Written Opinion of the ISA for PCT/FI2018/050546 dated Oct. 16, 2018, 8 pages.
Office Action dated Jun. 8, 2021 in Japanese Application No. 2020-511200, 11 pages.
Office Action dated May 14, 2021 in Chilean Application No. 202000438, 19 pages.
Office Action in corresponding CO App No. NC2020/0003153 dated Sep. 16, 2020 (translation), 3 pages.
Extended European Search Report for Application No. 18848493,5 (dated Apr. 8, 2021).
Office Action dated Sep. 24, 2021 in Australian Application No. 2018321163, 6 pages.
Office Action dated Dec. 10, 2021 in corresponding Korean Application No. 10-2020-7008325 (with translation), 11 pages.
Office Action dated Jul. 30, 2021 in corresponding Korean Application No. 10-2020-7008325 (with translation), 12 pages.

* cited by examiner

LEAKPROOF AND LIQUID-TIGHT PACKAGING BOX OF CORRUGATED BOARD AND METHOD FOR FABRICATING IT

This application is the U.S. national phase of International Application No. PCT/FI2018/050546 filed Jul. 13, 2018 which designated the U.S. and claims priority to FI Patent Application No. 20175758 filed Aug. 24, 2017, the entire contents of each of which are hereby incorporated by reference.

The object of the present invention is a one-piece blank for a leakproof and liquid-tight packaging box as defined in the preamble of claim 1. The invention also relates to a method according to claim 7 for fabricating said box as well as to a leakproof and liquid-tight packaging box of corrugated board according to claim 13, the box being structurally strong and stackable one on top of another.

Numerous different packagings are known in the packaging sector, which have been developed for differing needs. Many aspects must be addressed when designing packaging such as, inter alia, the fabrication and storage of the packaging, to its use when packing as well as to transportation and storage when packed. The corner structures in packaging boxes that must be liquid-tight and leakproof are in most cases a problematic point. In addition, many packaging boxes must be structurally strong and capable of bearing heavy weights. Liquid-tight and leakproof packaging boxes that must be stackable one on top of another are needed in particular in the food industry. Leakproof packaging boxes manufactured from expanded polystyrene or plastic, fillable from above and stackable one on top of another, are typically used for preserving and transporting fish and meat. These types of packaging boxes must withstand a load of at least 20 kg, and the boxes are typically stacked one on top of another in layers of 10. As a consequence of this, another substantial problem has been the structural rigidity of the packaging box and its stacking strength. Another problem in plastic solutions is the storage space required by them and the disposal of them after use. The materials in many packagings are not renewable nor are they necessarily recyclable, so from an environmental perspective their use is not ecological.

Also known in the art are liquid-tight packagings fabricated from corrugated board. One solution known in the art is presented in publication PCT/FI2016/050662. The solution relates to corrugated board packagings, and blanks thereof, to be formed mechanically or manually without adhesive, that are tight against liquid and leaks from inside and also tight against damp and liquid from outside. Another solution is disclosed in utility model FI 10658. A solution provided with a corner bellows, which is per se known in the art, is used in the aforementioned publication. The structure has a leakproof corner with integrated lid flaps in such a way that the stacking planes of the end lock into the counterslots of the top edge of the leakproof corners. One shortcoming of the structure is the uncertainty of the locking under stress. There is not sufficient friction in the flap coming between stacking planes nor does the flap have the necessary locking to bind the structure; this is particularly true in corrugated board with a slippery PET coating. The corner tries to loosen when erected, because there are a number of board layers in the end. Owing to the aforementioned structure, they function like a spring in the corner, trying to push the box outwards from the corners. Since the flaps coming between the stacking planes do not have proper locking, this results in the bulging of the corner and even in stress endeavoring to open the structure. A substantial problem of corrugated board boxes with liquid-tight corners and provided with corner bellows has been that with heavy box weights the end of the box bulges outwards, as a consequence of which a box stacked upon it tries to press inside the box below it. In some liquid-tight corner solutions the long sides are locked with slips of cardboard between the end fold. The solution does not, however, provide sufficiently tight locking for the long sides and consequently the loose structure weakens the load-bearing capability.

Leakproof solutions fabricated from corrugated board that are fillable from above and are also better at keeping their firmness have also been used for preserving and transporting foodstuffs containing liquid in such a way that separate stacking planes for the top parts are formed in them, but these planes are often wide and hamper packing. The aim of the present invention is to achieve a solution by means of which the drawbacks of prior art are avoided. The structure of the packaging according to the invention remains fully liquid-tight also when heavily packed. In addition, the packaging retains its shape essentially unchanged, even though a number of layers are stacked one on top of another on top of it.

More precisely, the invention is characterized by what is presented in the claims.

In the following, the invention will be described in more detail by the aid of an embodiment with reference to the attached drawings, wherein.

The invention relates to a liquid-tight and leakproof packaging box mechanically glueable in such a way that the packaging is a packaging box fabricated from a single piece of corrugated board.

The corrugated board used in the invention is, depending on the operating site, double-layered or triple-layered conventional board. If special properties are required of the material, e.g. to prevent the passage of grease, moisture and gas, the linerboard of the corrugated board is plastic-coated, or alternatively a plastic film is laminated between the paper layers. The plastic functions as a barrier material in such a way that the package box is leakproof and liquid-tight in terms of both its structure and its materials. The plastics generally used in corrugated board are e.g. polyethylene, polyester and polypropylene.

The state of the art is described in the aforementioned PCT/FI2016/050662 specification. The solution referred to is primarily intended for lighter loads, so that glue is not needed at all in erecting it. Owing to the mechanically glued structure, the solution according to the invention withstands a considerably larger load than a solution according to prior art. Technically, the invention has essential differences; for example, the corner surfaces for achieving a leakproof corner come on the outside of the short side of the package box. Large glueing flaps are formed on the end, which flaps are folded onto the long side in the glueing phase. In this way, the structure is strong and torsionally rigid. An extremely strong beam structure that stiffens the structure more than before is formed on all the sides in the invention with double-folding. As a result of the solution, conventional stacking planes are not needed in the invention, but instead shoulders forming a beam structure perform the same task. Compared to a conventional solution, they are narrower and do not hamper packing and unpacking. What is also essential is that, if necessary, it is possible to add stacking claws and counter apertures for them to the solution according to the invention, so that the packaging box is able to stay in position when piled one on top of another. In addition, the new structure of the end of the liquid-tight and leakproof package box according to the invention enables the use of a so-called normal handle. Corresponding stacking claws or handles facilitating handling can not be formed in liquid-tight and leakproof packaging boxes according to the state of the art.

Figure 1:
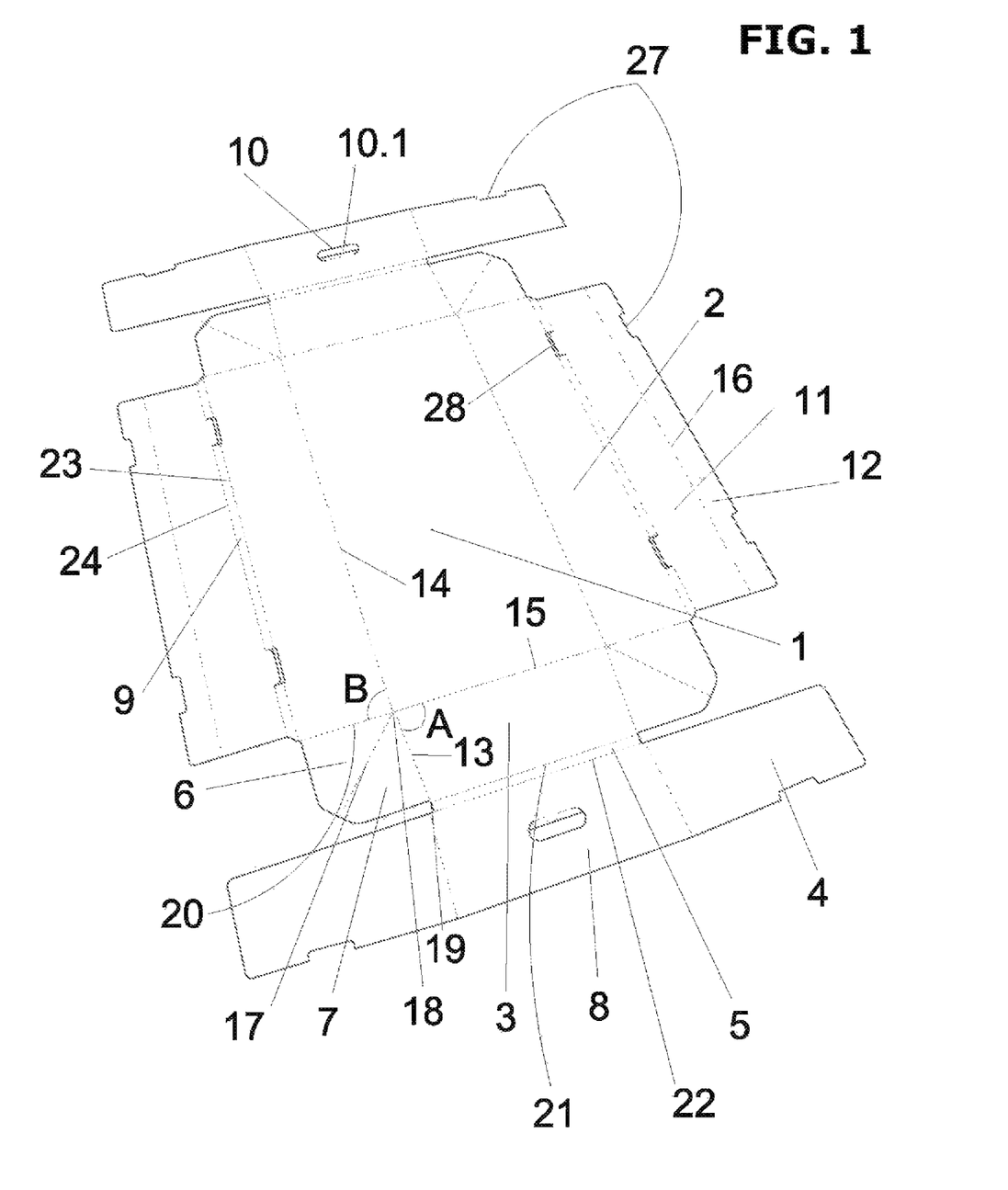
FIG. 1 presents a packaging box blank according to the invention.
Figure 2:
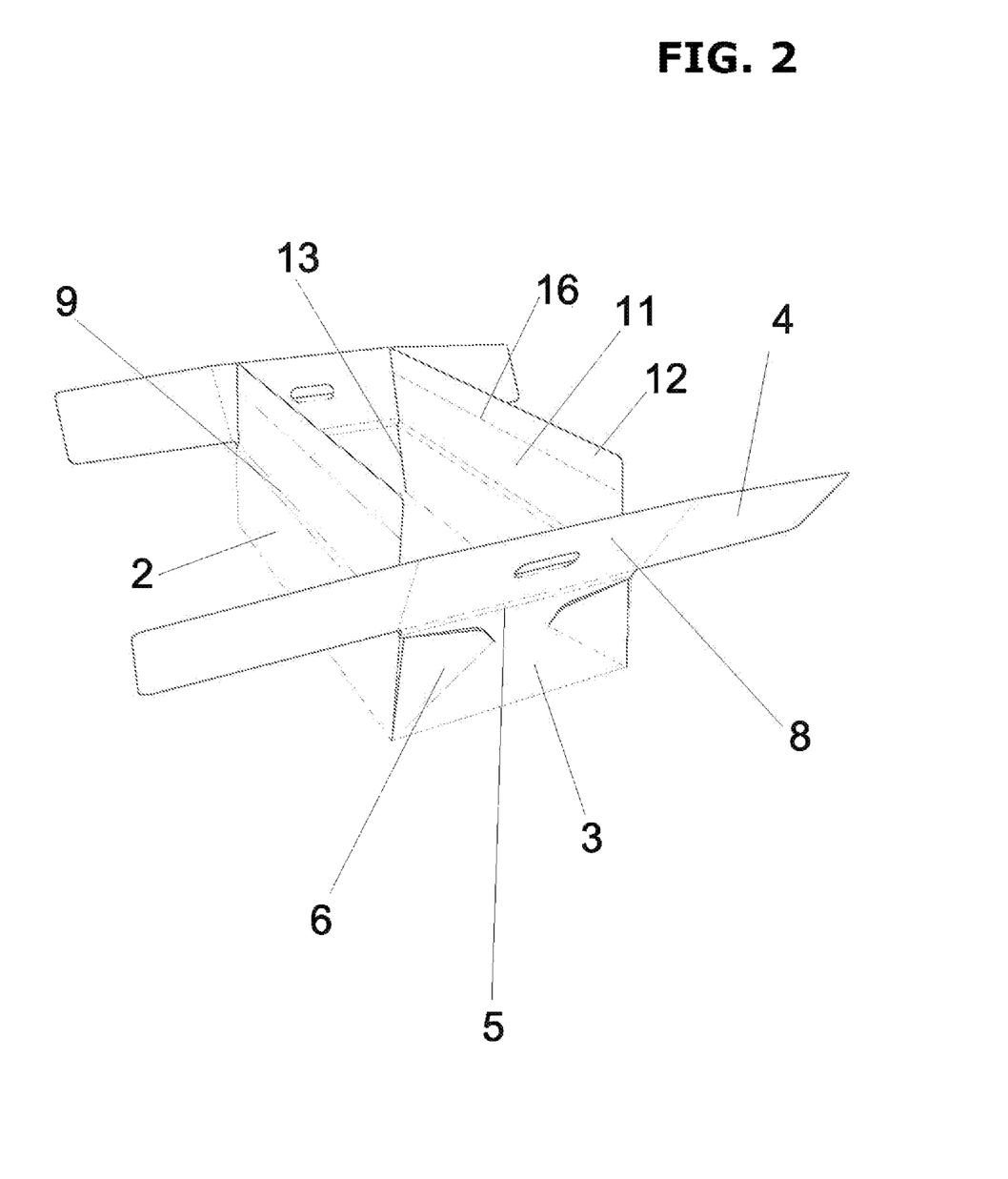
FIG. 2 presents a partially erected packaging box according to the invention.

According to FIGS. 1 and 2, the box blank according to the invention has a base surface 1 and folding surfaces 2, 3, 4, 5, 6, 7, 8, 9, 11, 12. More precisely, the folding surfaces are: an inner vertical surface 2 of the long sides, an inner vertical surface 3 of the short sides, an outer vertical surface 8 of the short side and a glueing flap 4 of the short side. The double-foldable shoulders of the short side, which are folded from the folding lines 21, 22, forming a rigid beam structure 5. The corner surface 6 of the long side and the corner surface 7 of the short side, with which a leakproof corner structure is brought about from the folding line 17. The double-foldable shoulders of the long sides, which are folded from the folding lines 23, 24, forming a rigid beam structure 9. The outer vertical surface 11 and 12 of the long sides are folded in such a way that the vertical surface 11 forms the top part of the long side, and the vertical surface 12 the bottom part, and between them is the folding line 16.

According to FIG. 1, with these folding surfaces a mechanically formed packaging box, formed using glueing as an aid, is obtained from one die-cut blank, the box having folding surfaces 2, 3, 6 and 7 forming a liquid-tight and leakproof corner structure. According to FIGS. 2 and 3, the corner surface 6 of the long side and the corner surface 7 of the short side are folded against each other from the folding line 17 for achieving a leakproof corner structure. What is essential in the invention is that the corner surface 7 of the short side is folded to attach to the exterior surface of the vertical surface 3 of the short side, i.e. attached to the outer surface of the packaging box.

Figure 3:
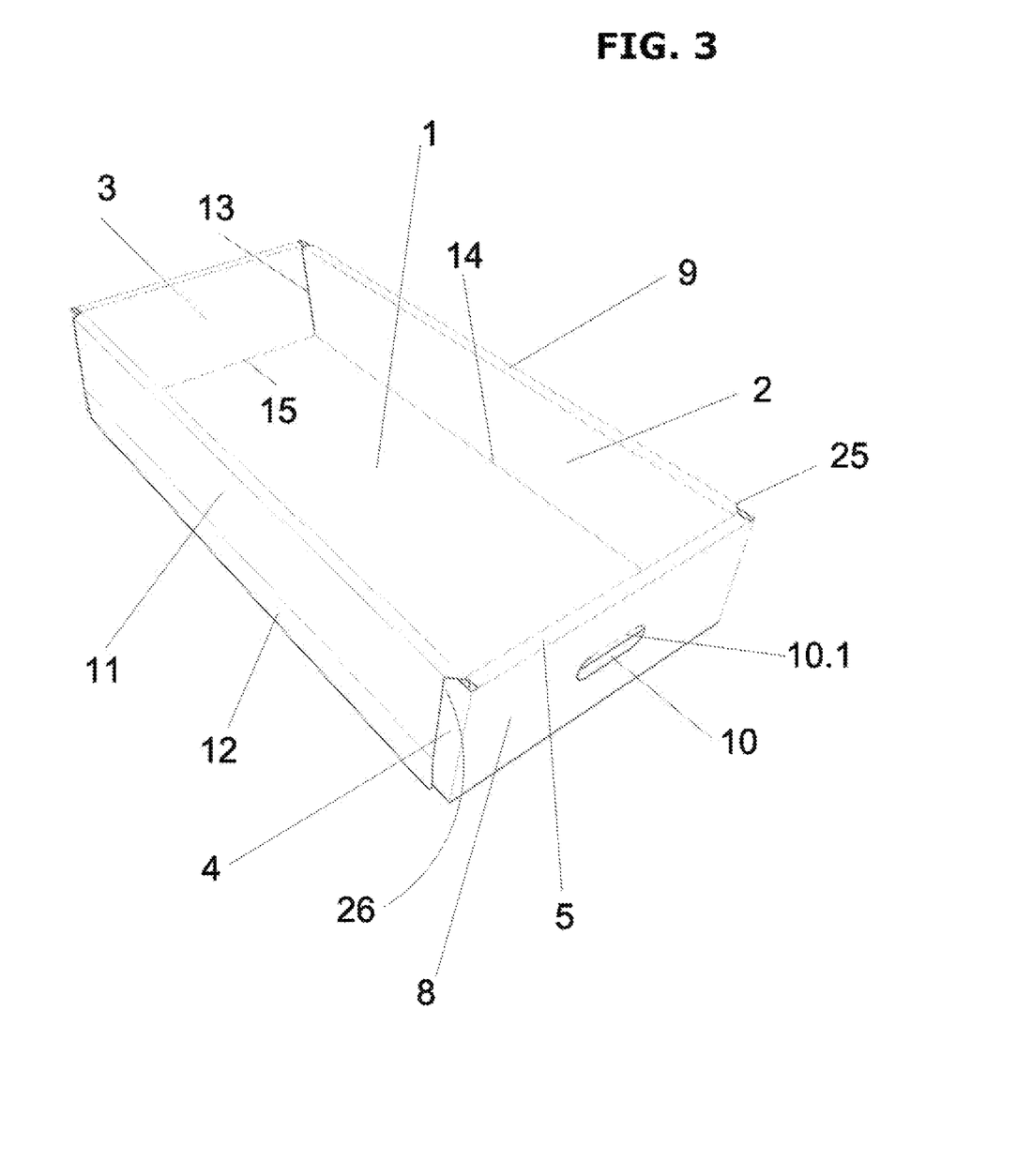
FIG. 3 presents an erected packaging box according to the invention.

In addition, it is important to the invention that the double-foldable beam structure 5 of the short side is folded from the folding lines 21, 22 together with the outer vertical surface 8 of the short side onto the exterior surface of the surface 3 of the short end, i.e. onto the outer surface of the package box. More precisely, in such a way that the vertical surface 8 is folded against the outer surface of the surface 3 and attached to the surface 6 of the leakproof corner. The double-foldable beam structure 5 ensures that at least the space required by the combined material thickness of the corner surface 6 of the long side and of the corner surface 7 of the short side remains for said surfaces. In this way the corner surfaces 6, 7 settle between the surfaces 3 and 8 tightly without, however, causing compression breakage in the honeycomb structure of the corrugated board.

Figure 4:
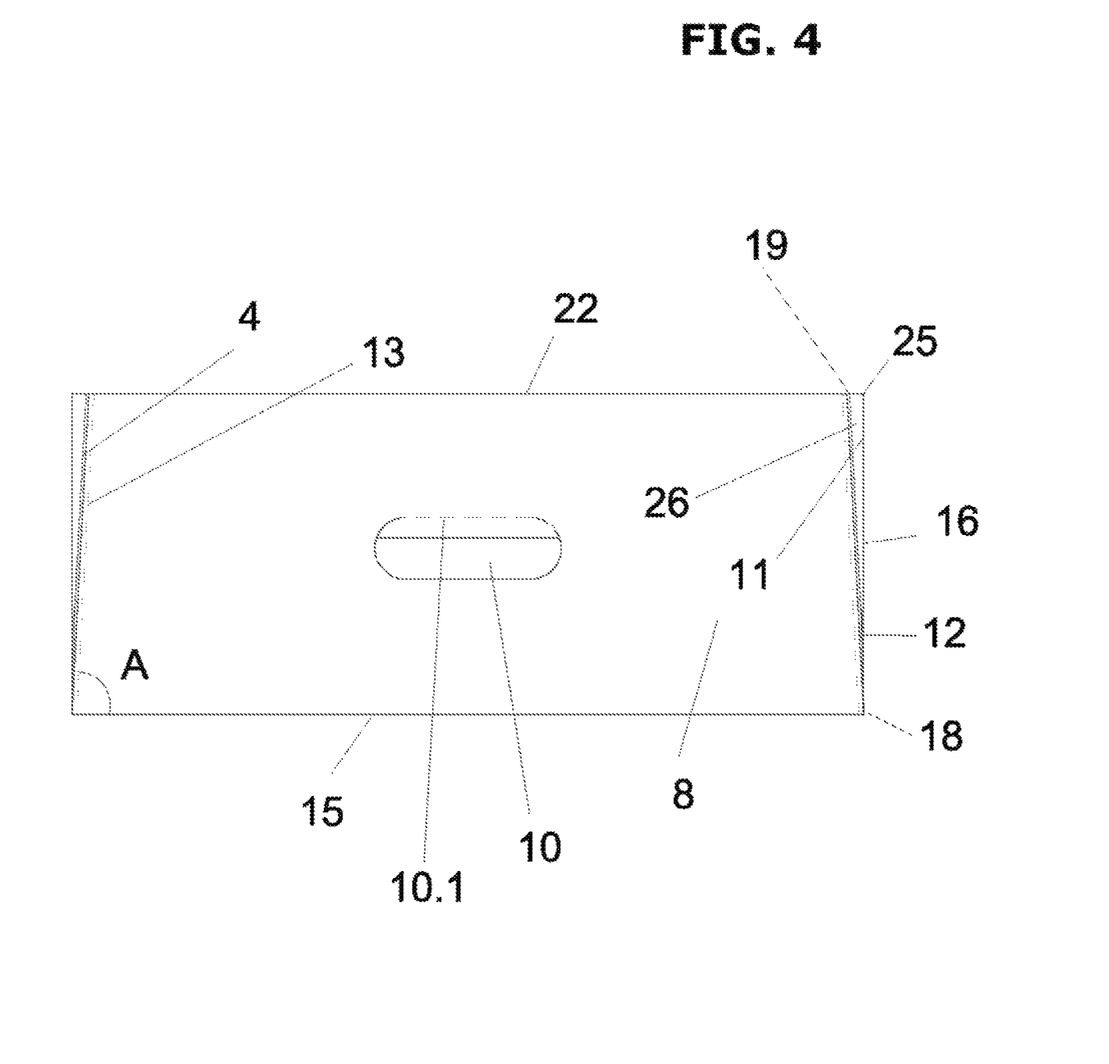
FIG. 4 presents the erected end part of a packaging box.

The glueing flaps 4 are extremely important from the standpoint of the invention, said flaps being folded against the outer surface of the surfaces 2 of the long side, to which they are attached by glueing. In this way, the torsional rigidity of the corners of the box is ensured in all situations. After this the double-foldable shoulders of the long side, which form a beam structure 9, are folded from the folding lines 23, 24 to outside the box with the outer vertical surface 11 and 12 of the long side in such a way that the glueing flap 4 remains between the inner vertical surface 2 and the outer vertical surface 11 and 12. Gluing the surfaces 11 and 12 of the long side against the glueing flaps 4 straightens the structure. The folding line 16 between the surface 11 and 12 facilitates glueing and acts on the straightness of the long side, functioning as an additional stiffener. The double-foldable beam structure 9 ensures that at least the space required by the material thickness of the glueing flap 4 remains for the glueing flap 4. In this way, the glueing flap 4 settles tightly between the surfaces 2, 11 and 12 without, however, causing compression breakage in the honeycomb structure of the corrugated board. Owing to the double-folded beam structure 9, the attachment by glueing of the outer surfaces 11 and 12 of the long sides to the glueing flaps 4 ensures an extremely rigid long side. As a result of the double folds to be folded on the outside of the packaging box, a rigid beam structure 9 and 5 is formed on the box on all sides, the beam structure also preventing bulging of the sides under stress. According to FIGS. 3 and 4, one of the advantages of the double-folded beam structure 9 and 5 is the air gap 26 forming between the walls 2, 3 and 8, 11, 12, which gap improves the insulation of the box and functions as a buffer. As a result of the beam structure 9, 5, the boxes can be safely stacked one on top of another.

According to FIG. 3 the shoulders brought about with the double folds of the folding lines 21, 22, 23, 24, which shoulders form a beam structure 5 and 9, are extremely strong in the finished packaging box. In this way separate stacking planes, according to the state of the art, of the top parts are not needed, and when of suitable width also enable easy filling of the box. In other words, as a result of the double folds 21, 22, 23, 24 to be folded on the outside of the box, a rigid beam structure 9 and 5 is formed on the box on all sides, the beam structure also preventing bulging of the sides under stress. One of the advantages of the double-folded beam 9 is the air gap forming between the walls 2, 3 and 8, 11, 12, which gap improves the insulation of the box. As a result of the beam, the boxes can be safely stacked one on top of another.

As a result of the folding line 13, the long sides 2 together with the leakproof corner structure 6, 7 and the glueing flap 4 are inward cones. In other words, the inner top part of the long side 2 inclines towards the internal part of the packaging box. The conical structure is brought about by forming the folding line 13 between the base surface 1 and the long side 2 to slant with respect to folding line 14. More particularly, in such a way that the folding line 13 slants in towards to the vertical surface 3 of the short side with respect to the straight folding line 14 of the long side as viewed from the base surface 1. In this way, the inner folding line 15 of the end 3 of the short side that is closer to the base surface 1 of the blank is longer in length than the outer folding line 21 of the end 3. The folding line 21 is at the same time the inner folding line 21, with respect to the base surface 1, of the folding lines 21, 22 of the double fold. In this way, a slanted folding line 13 with respect to the base surface 1 of the blank is formed between the end point 18 of the inner folding line 15 nearer to it and the end point 19 of the outer folding line 21 of the end 3. The angle A between the inner folding line 15 and the slanted folding line 13 is less than 90°, most preferably in the range 89°-85°.

According to FIG. 1, the angle B between the long side 2 and the corner surface 6 of the long side is 90°. According to FIG. 4, as viewed from the end of the packaging box, from the outside of the finished packaging box, the long sides 11, 12 are at a right angle of 90 degrees at the point 18 and 25. The folding lines 23, 24 of the double fold folding to the outside form a beam structure 9 that is at an angle of 90 degrees to the sides 11 and 12. As a result of this right angle, when a number of packaging boxes are one beside another, clearances are not able to occur in stacking.

In particular, what is essential, however, is the inner cone structure formed by the folding line 13 of the packaging box. As viewed from the end of the packaging box of FIG. 4, according to points 18 and 19, the finished packaging box slants conically inwards in terms of its interior dimensions in the width direction. According to FIG. 1, when the folding line 13 is slanted with respect to the fold 14, the inner vertical surface 2 of the long sides deflects when forming the packaging box inwards to the extent of the difference in the number of degrees between angle A of the fold of line 13 of the folding line and angle B. which is in the range of 1-5°.

In one application according to the embodiment, the angle A is 86.3°, in this way in the embodiment the angle of inclination brought about by the interior cone structure of the finished packaging box is 3.7°, typically the angle is in the range of 1-5°. In this way, the inner cone structure functions as a structural buffer, leaving an air gap 26 in the top part of the packaging box and stiffening the packaging box. What is essential is that the outward bulging of the side of the packaging box is avoided in this way, in which case it is safe to stack the boxes one on top of another.

Figure 5:
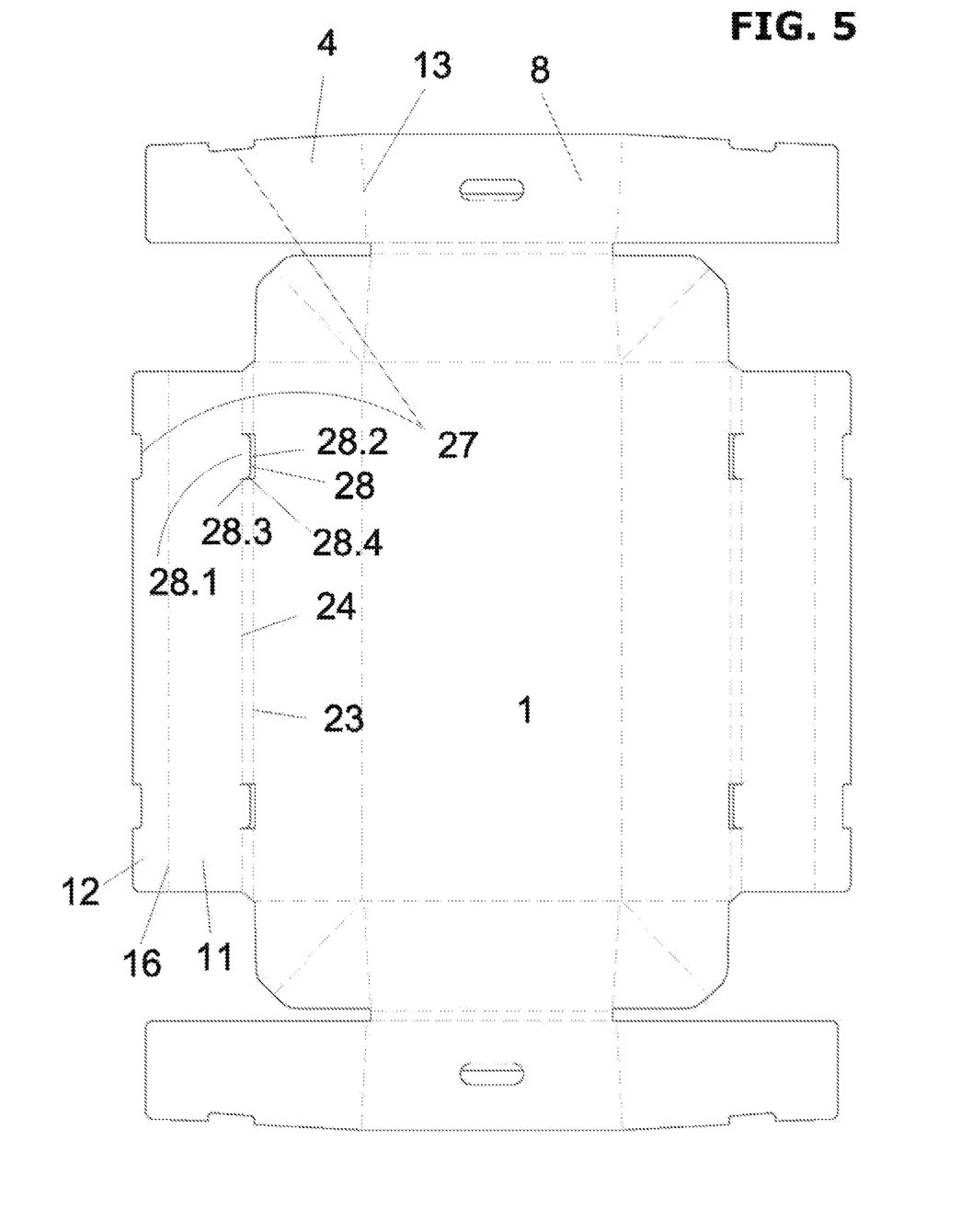
FIG. 5 presents a detail of the blank for a packaging box.

According to FIG. 5, in addition to what is presented above, stacking claws 28, and counter-apertures 27 for said claws, are formed in the leakproof and liquid-tight packaging box according to the invention, into which apertures the stacking claws 28 lock. More precisely, the stacking claws 28 are formed in the beam structure 9 in such a way that they are cut from one long side 28.2 and from both short sides 28.3, 28.4 and also, if necessary, are folded from the second long side 28.1 of the folding line upwards forming a vertical fastener. The counter-apertures 27 are formed in the lower vertical surface 12 of the long side and in the glueing flap 4 in such a way that cavities corresponding to the stacking claws 28 are cut in them. In this way, the function of the stacking claws 28 in the fully erected leakproof and liquid-tight packaging box is to ensure the boxes remain one on top of the other and in position. The stacking claw 28 on the top surface of the box below is placed into the hole of the counter-aperture 27 in the base of the box coming above it. What is new in the structure according to the invention is that the interior of the box remains fully leakproof even though stacking claws 28 are added to the structure.

The handle apertures 10, in which are flaps 10.1, of the end of the packaging box are also essential to the invention. A handle aperture 10 is formed from the surface 8 of the end, the flap 10.1 is folded against the packaging box, the double-folding line 21, 22 and the beam structure 5 giving space for fingers when lifting the box. It has not earlier been possible to form these types of handle apertures in liquid-tight and leakproof package boxes. The handle apertures are extremely important for allowing heavy packaging boxes to be handled safely and stacked one on top of another. That being the case, the solution according to the invention comprises numerous new and inventive features that do not occur in solutions according to the state of the art.

It is obvious to the person skilled in the art that the invention is not limited to the embodiments presented above, but that it can be varied within the scope of the claims presented below.

The invention claimed is:

1. A one-piece blank, of corrugated board, for a leakproof and liquid-tight packaging box, the blank comprising a base surface, an inner vertical surface of a long side of the box, an inner vertical surface of a short side of the box, a corner surface of a corner structure of the short side, a corner surface of the long side and a folding line between them in such a way that the surfaces form a liquid-tight and leakproof corner structure mechanically erected using glueing as an aid, wherein for achieving a torsionally rigid and strong structure the blank for a packaging box also comprises:
   a folding line between the vertical surface of the short side and the corner surface of the liquid-tight and leakproof box, which folding line slants in towards to the vertical surface with respect to the folding line as viewed from the base surface,
   an outer vertical surface of the short side and glueing flaps on both sides of it,
   folding lines of the short side and a double-foldable beam structure between them as well as folding lines of the long side and a double-foldable beam structure between them,
   wherein the blank comprises stacking claws and counter-apertures for them, into which apertures the stacking claws lock in such a way that the stacking claws are formed in the beam structure, so that they are cut from one long side and from both short sides, counter-apertures are formed in the lower vertical surface of the long side and in the glueing flap, in such a way that cavities corresponding to the stacking claws are cut in them.

2. A one-piece blank according to claim 1 for a leakproof and liquid-tight packaging box, wherein an inner folding line of the end of the short side that is closer to the base surface is longer in length than an outer folding line of the end, in which case a slanted folding line is formed between the end point of the inner folding line and the end point of the outer folding line.

3. A one-piece blank according to claim 2 for a leakproof and liquid-tight packaging box, wherein the angle A between the inner folding line and the slanted folding line is less than 90°, most preferably in the range 89° 85° and the angle B between the long side and the corner surface of the long side is 90°.

4. A one-piece blank according to claim 1 for a leakproof and liquid-tight packaging box, wherein the blank comprises the outer vertical surface, of the long sides, the vertical surface forms the top part of the long side, and the vertical surface the bottom part of the vertical surface, and between them is the folding line.

5. A one-piece blank according to claim 1 for a leakproof and liquid-tight packaging box, wherein the blank comprises handle apertures, with flaps, formed in the surface of the short sides.

6. A one-piece blank according to claim 1 for a leakproof and liquid-tight packaging box, wherein the blank comprises the stacking claws and the counter-apertures for them, into which the apertures the stacking claws lock in such a way that the stacking claws are formed in the beam structure, so that they are cut from the one long side and from both of the short sides, and also from another long side of the folding line.

7. A leakproof and liquid-tight packaging box of corrugated board comprising:
   a corner surface folded along a folding line, which surface is folded and glued to an outer surface of an inner vertical surface of a short side of the box,
   an inward-formed cone structure of an inner vertical surface of a long side of the box,
   glued flaps at both ends of the outer vertical surface, which are folded and glued against the inner vertical surfaces of the long sides, folding lines of the short side and a double-foldable beam structure between them, and also folding lines of the long side and a double-foldable beam structure between them in such a way that a rigid, load-resistant beam structure is formed on all sides of the packaging box, wherein stacking claws, and counter-apertures for them, are formed in the beam structure in the lower vertical surface of the long side and in the glueing flap in such a way that cavities corresponding to the stacking claws are cut in them.

8. A torsionally rigid, leakproof and liquid-tight packaging box according to claim 7, wherein by means of the slanted folding line the top part of the vertical surface of the side is slanted towards the inside part of the packaging box in such a way that the vertical surfaces together with the corner surfaces and the glueing flaps are inward cones.

9. A torsionally rigid, leakproof and liquid-tight packaging box according to claim 7, wherein the beam structure formed by means of the folding lines of the double fold folding to the outside is at an angle of 90 degrees to the vertical surfaces of the long sides.

10. A torsionally rigid, leakproof and liquid-tight packaging box according to claim 7, wherein handle apertures, with flaps, are formed in the surface of the short sides.

* * * * *